US009604727B2

(12) United States Patent
Delbosc

(10) Patent No.: US 9,604,727 B2
(45) Date of Patent: Mar. 28, 2017

(54) AERODYNAMIC FAIRING

(71) Applicant: AIRBUS OPERATIONS (S.A.S.), Toulouse (FR)

(72) Inventor: Amaury Delbosc, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 14 days.

(21) Appl. No.: 14/713,438

(22) Filed: May 15, 2015

(65) Prior Publication Data
US 2015/0329212 A1 Nov. 19, 2015

(30) Foreign Application Priority Data

May 16, 2014 (FR) ...................... 14 54379

(51) Int. Cl.
*B64D 27/26* (2006.01)
*B64C 7/02* (2006.01)
*B64D 29/02* (2006.01)

(52) U.S. Cl.
CPC ............... *B64D 27/26* (2013.01); *B64C 7/02* (2013.01); *B64D 29/02* (2013.01)

(58) Field of Classification Search
CPC ............ B64D 27/26; B64D 29/02; B64C 7/02
USPC .......................................................... 244/54
See application file for complete search history.

(56) References Cited

U.S. PATENT DOCUMENTS

| 4,238,092 A * | 12/1980 | Brennan | ............... | F02K 1/00 244/54 |
| 4,712,750 A * | 12/1987 | Ridgwell | ............... | B64C 7/02 244/117 A |
| 5,887,822 A * | 3/1999 | Thornock | ............... | B64D 33/04 244/53 R |
| 6,126,110 A * | 10/2000 | Seaquist | ............... | B64D 27/18 244/54 |
| 7,784,733 B2 * | 8/2010 | Diochon | ............... | B64D 27/26 244/54 |
| 8,118,252 B2 * | 2/2012 | Dumont | ............... | B64D 33/04 244/130 |

(Continued)

FOREIGN PATENT DOCUMENTS

| EP | 2 390 187 | 11/2011 |
| FR | 2 913 665 | 9/2008 |
| FR | 2 960 519 | 12/2011 |

OTHER PUBLICATIONS

Search Report for FR 1454379, dated Feb. 23, 2015, 2 pages.

*Primary Examiner* — Brian M O'Hara
*Assistant Examiner* — Keith L Dixon
(74) *Attorney, Agent, or Firm* — Nixon & Vanderhye P.C.

(57) ABSTRACT

An aerodynamic fairing for a pylon of a turbojet engine, the fairing including: a frame oriented in a plane transverse to a longitudinal axis of the pylon, wherein the frame includes an upper edge, opposite side edges and a lower edge; a deck attached to the lower edge of the frame; a downstream portion of the deck includes a front edge region overlapping a rear edge portion of an upstream portion of the deck, wherein an upper surface of the front edge region is joined to the lower edge of the frame such that the front edge portion is sandwiched between the lower edge of the frame and the rear edge region of the upstream portion of the deck, and a flange extends between and attaches the upstream portion of the deck and the frame and a gap is between the lower edge of the frame and the upstream portion of the deck.

18 Claims, 7 Drawing Sheets

(56) References Cited

U.S. PATENT DOCUMENTS

| | | | |
|---|---|---|---|
| 8,662,440 B2* | 3/2014 | Journade | B64D 33/04 244/121 |
| 8,814,080 B2* | 8/2014 | Dumont | B64D 29/02 244/121 |
| 8,939,398 B2* | 1/2015 | Letay | B64D 27/26 244/53 B |
| 2009/0095443 A1* | 4/2009 | Connelly | B64D 33/04 165/51 |
| 2010/0051743 A1 | 3/2010 | Dumont | |
| 2011/0011972 A1* | 1/2011 | Vache | B64D 27/26 244/54 |
| 2011/0155847 A1* | 6/2011 | Journade | B64D 29/02 244/54 |
| 2011/0290935 A1* | 12/2011 | Machado | B64D 27/18 244/54 |
| 2011/0290936 A1 | 12/2011 | Machado | |

* cited by examiner

AERODYNAMIC FAIRING

RELATED APPLICATION

This application claims priority to French patent application 1454379, filed May 16, 2014, the entirety of which is incorporated by reference.

BACKGROUND OF THE INVENTION

The present invention relates to an aerodynamic fairing of the rear section of an aircraft pylon, likewise referred to as the aft pylon fairing or APF.

In a known manner, the aerodynamic fairing takes the shape of a box comprising two side panels assembled to each other by transverse stiffening frames spaced apart from one another along the longitudinal axis of the fairing, as well as a heat protection deck fixed on the one hand to the side panels and on the other to the frames.

An aft pylon fairing is exposed to high temperatures coming from the aircraft's powertrain assembly. In particular, the heat protection deck is subjected to a high-temperature primary flow from the turbojet (in the order of 600° C.), while the side panels are subjected to a secondary flow from the turbojet with a relatively low temperature (in the order of 150° C.) compared with that of the primary flow. These temperature differences generate high thermo-mechanical stresses on the box which tend to deform it.

French patent document FR1361556 discloses an aerodynamic fairing comprising a deck formed by consecutive portions disposed along the longitudinal axis of the fairing, each portion being directly fixed to a first frame and to a second frame directly consecutively to the first. The fact that there is a longitudinal mechanical cut-off between two consecutive deck portions means that each deck portion has its own heat expansion, something that helps to reduce the thermo-mechanical stresses acting on the box. Moreover, to prevent the high-temperature primary flow from rising and spreading in the interfaces between two consecutive deck portions, the heat protection deck is made leak-proof by thin strips fixed to the outer face of the deck portions in such a manner as to cover said interfaces and guide the primary air flow along the outer faces of the deck portions. These thin strips are effective but, on the other hand, they have to be installed on the deck portions by means of screws which complicates and slows down the fabrication of the aerodynamic fairings.

BRIEF SUMMARY OF THE INVENTION

An aerodynamic fairing for a turbojet pylon has been conceived and is disclosed herein. The faring has the shape of a box extending along a longitudinal axis and comprising at least two consecutive deck portions, an upstream portion and a downstream portion, respectively, along the longitudinal axis and each having a front end and a rear end, the fairing comprising at least one frame oriented transversely to the longitudinal axis and having a lower edge, the upstream portion having its rear end fixed to said frame and the downstream portion having its front end fixed to said frame, the upstream portion being fixed to the frame by means of a rear flange with a non-zero space situated between the lower edge of the frame and the upstream portion, the front end of the downstream portion being situated between the lower edge of the frame and the upstream portion.

The aerodynamic faring is advantageous in that the partial covering of a deck portion by a deck portion consecutive thereto makes it possible to prevent the primary flow with a very high temperature from rising and spreading between these two deck portions at their interface.

BRIEF DESCRIPTION OF THE DRAWINGS

The characteristics of the invention mentioned below, as well as others, will appear clearer on reading the following description of exemplary embodiments, said description relating to the attached drawings, in which.

DETAILED DESCRIPTION OF THE INVENTION

Figure 1:
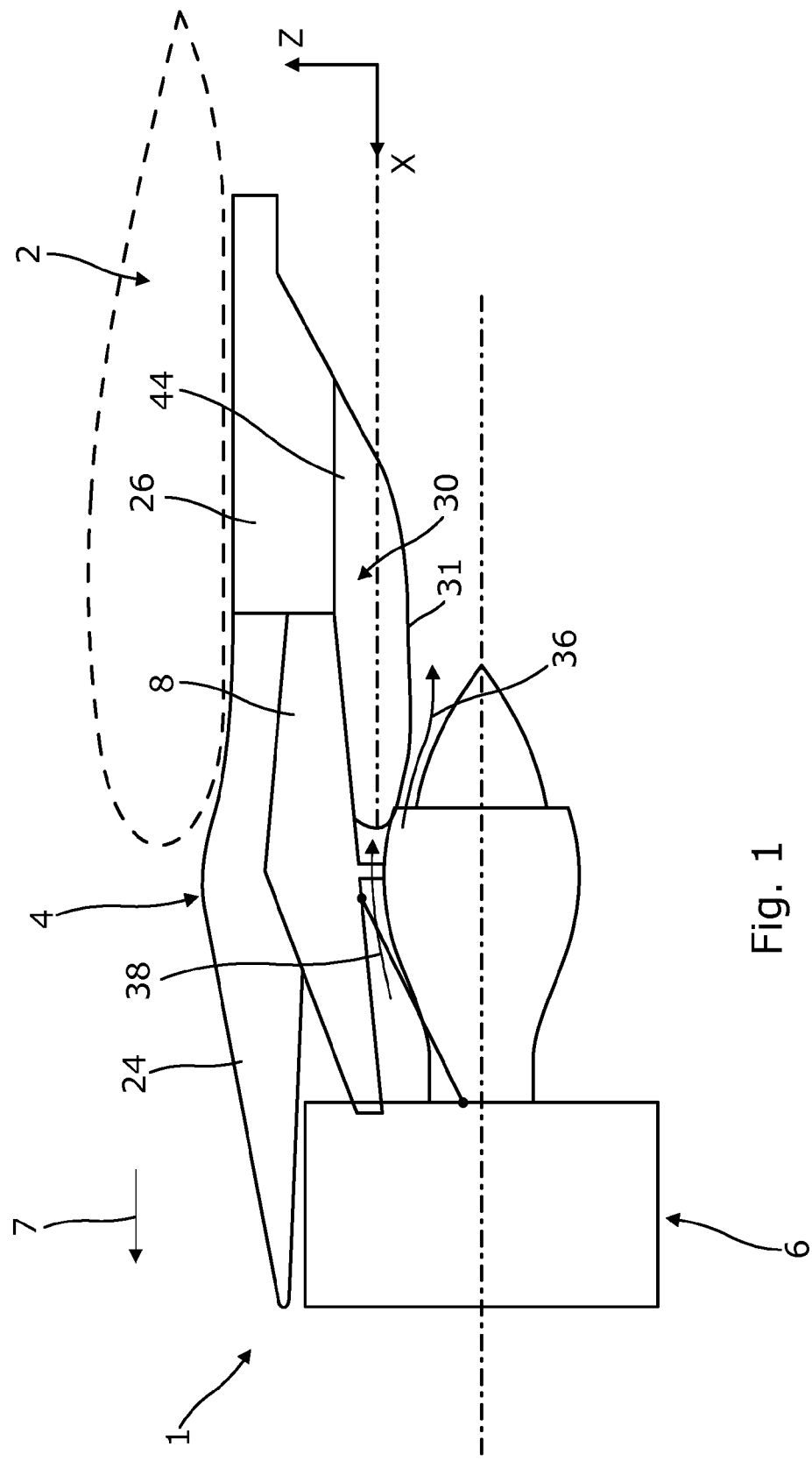
FIG. 1 is a schematic view of an aircraft wing provided with an engine pylon and an aerodynamic fairing according to the invention.

FIG. 1 shows an engine assembly 1 fixed beneath a wing 2 of an aircraft. The engine assembly comprises a pylon 4, as well as an engine 6 such as a turbojet attached to the wing 2 via the pylon 4. The pylon 4 comprises in a known manner a rigid structure 8, likewise referred to as the primary structure, allowing the turbojet 6 to be supported by known means.

The pylon 4 comprises secondary fairing-type structures. The secondary structures of the pylon 4 particularly include a front aerodynamic structure 24, a rear aerodynamic structure 26 and a rear aerodynamic fairing 30 which will be referred to as the fairing in the description below. The terms "front/upstream" and "rear/downstream" should be understood in relation to a direction (along x coordinate axis in FIG. 1) of movement of the aircraft developed as a result of the thrust applied by the turbojet 6, this direction being shown schematically in all the figures by the arrow 7.

Figure 2:
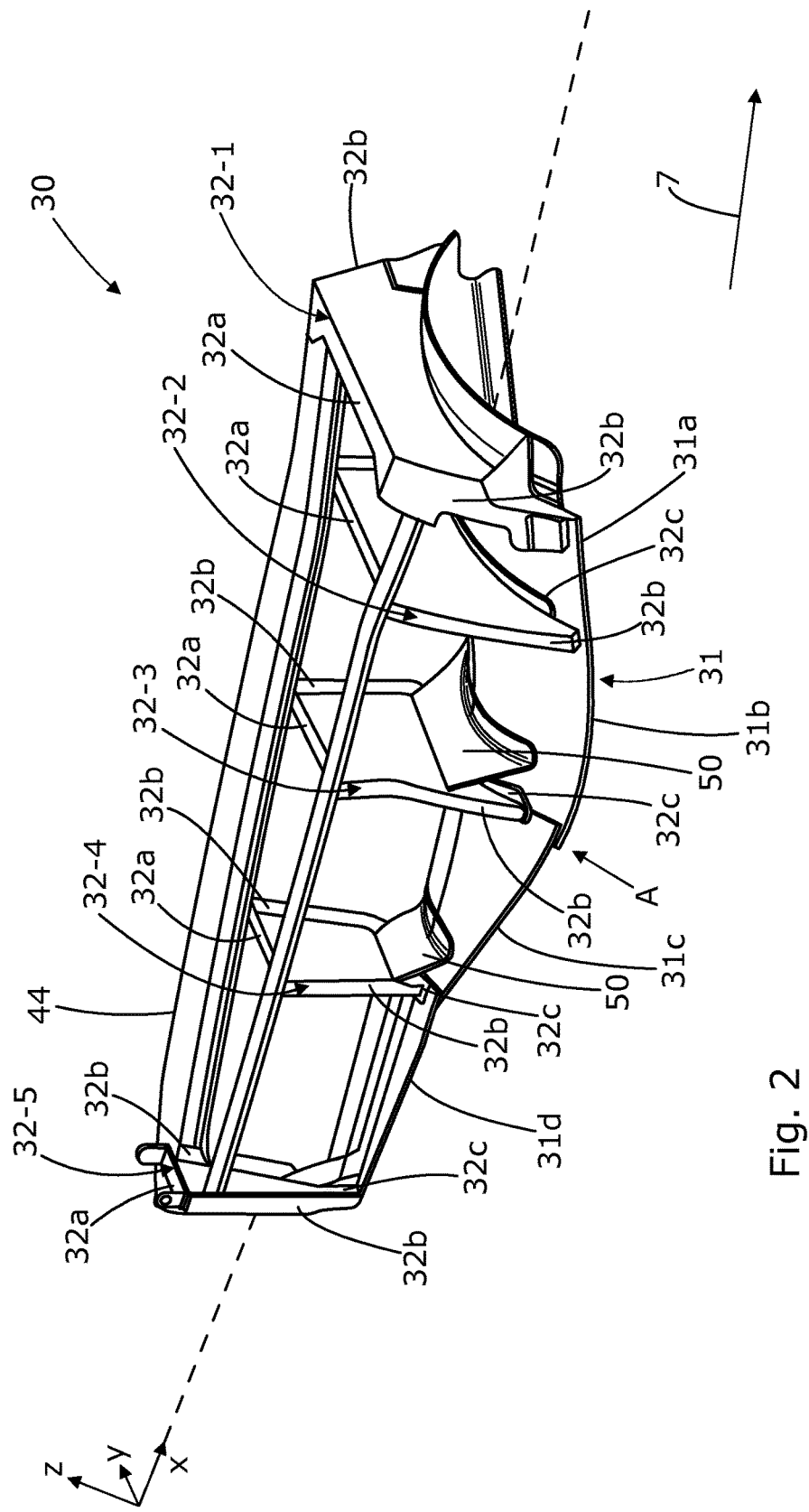
FIG. 2 is a perspective schematic view of the aerodynamic fairing in FIG. 1 according to a first embodiment of the invention.
Figure 4:
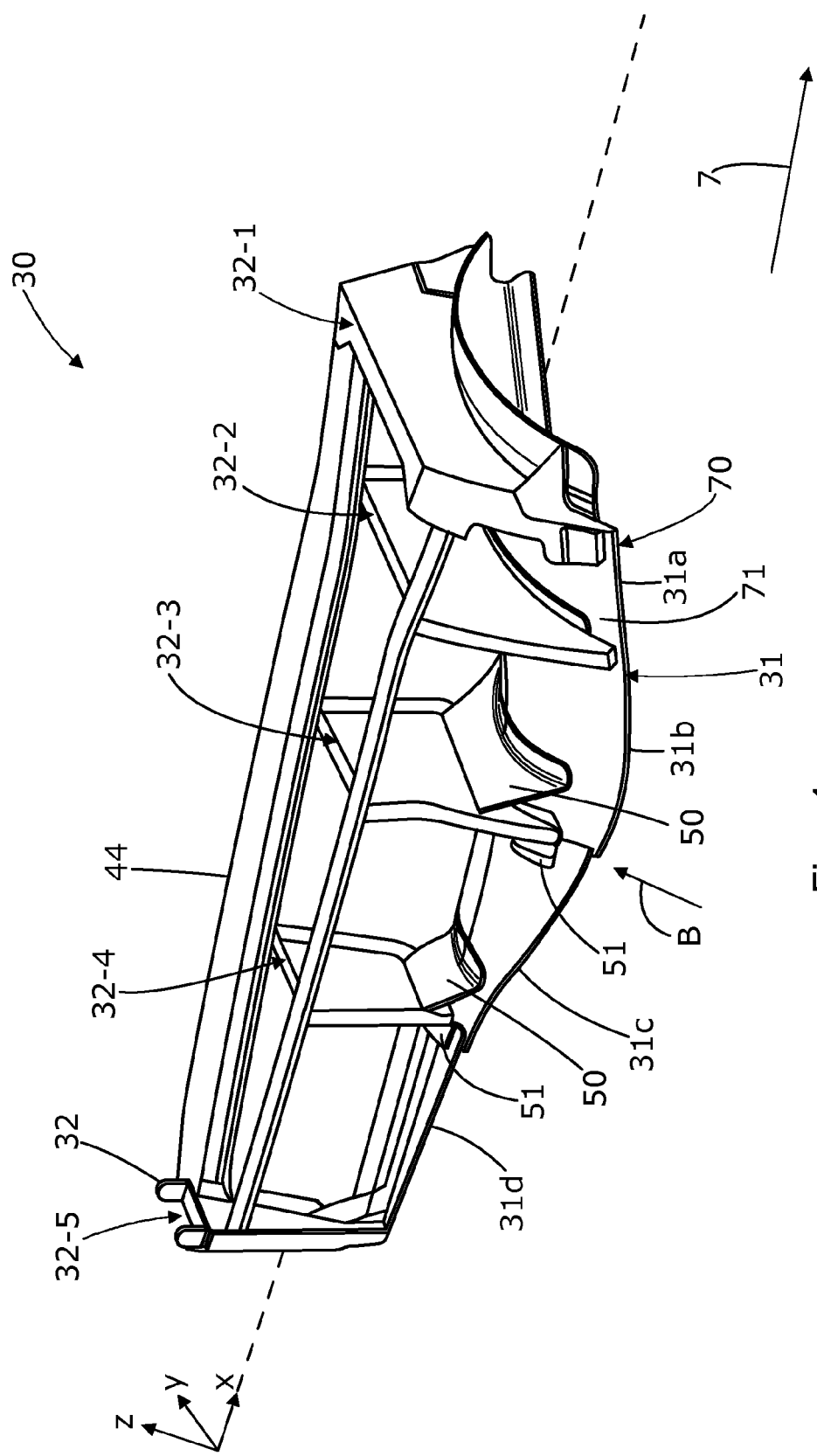
FIG. 4 is a schematic perspective view of the aerodynamic fairing in FIG. 1 according to a second embodiment of the invention.
Figure 6:
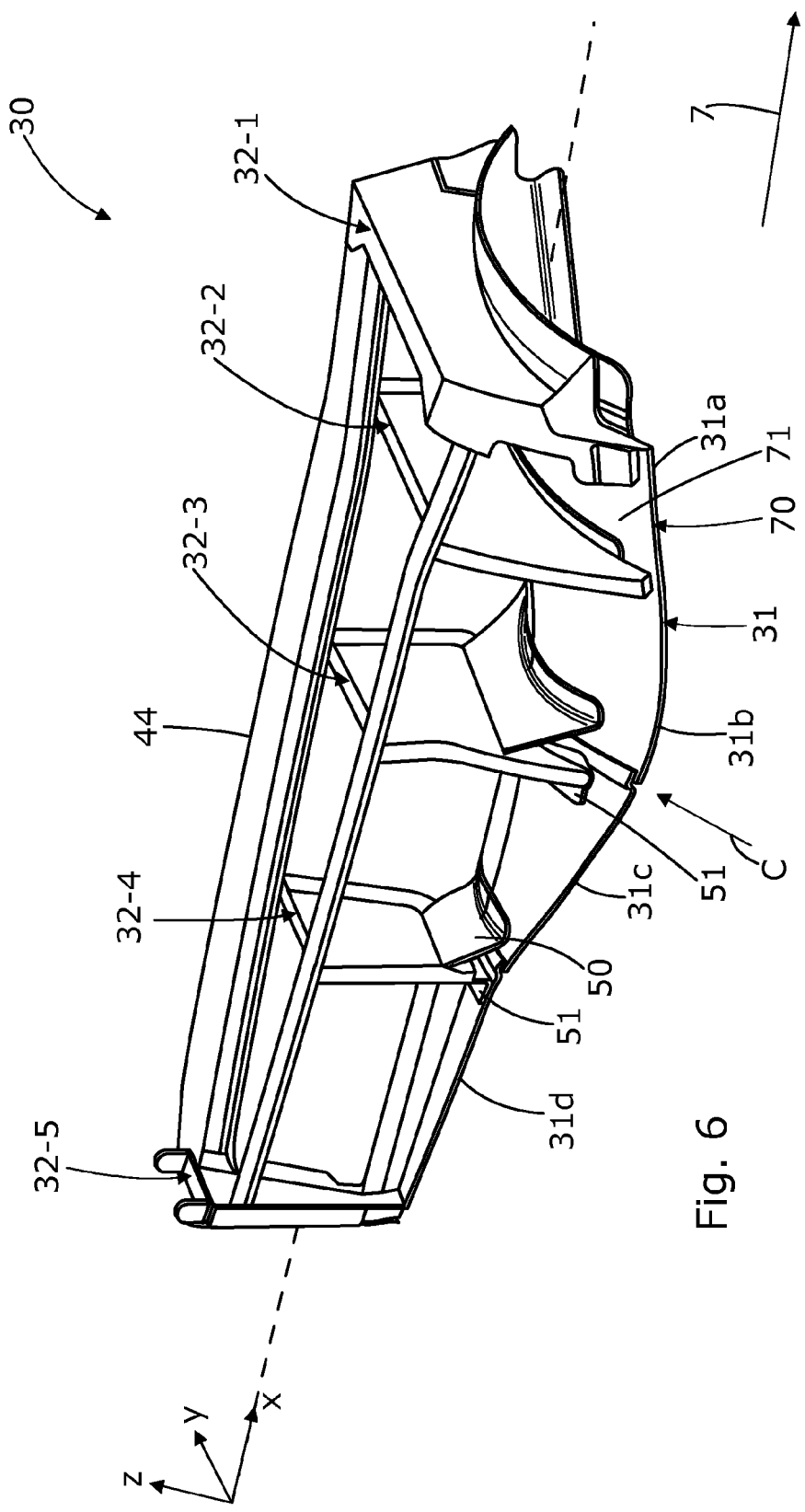
FIG. 6 is a schematic perspective view of the aerodynamic fairing in FIG. 1 according to a third embodiment of the invention.

As illustrated in FIGS. 2, 4 and 6, the fairing 30 takes the shape of a box open at the top. In other words, the fairing 30 is open to the other structures of the attaching device on which the box is intended to be mounted, namely the rear aerodynamic structure 26 and the rigid structure 8.

A heat protection deck 31 forms the lower part of the box of the fairing 30. The sides of the box of the fairing extend in a direction generally aligned with the longitudinal axis X are formed by two side panels 44, of which one is shown in FIGS. 2, 4 and 6. The fairing 30 further comprises a framework formed by transverse frames allowing the side panels 44 and the deck 31 to be held together and the box to be fixed to the aforementioned structures. In the example shown in FIGS. 2, 4 and 6, the fairing 30 comprises five frames 32-1 to 31-5.

The fairing 30 is not planar in a vertical plane XZ and substantially exhibits an arrow form (the point whereof is oriented towards the rear) in a horizontal plane XY. Moreover, the fairing 30 is closed by a frame 32-1 at its front end and by an inclined element in relation to the horizontal plane XY and fixed to a frame 32-5 at its rear end (the inclined element not being shown in the figures). On a transverse plane YZ to the box, the deck 31 has a curved form opening towards the outside (or concave) in relation to the fairing 30.

The deck 31 is formed by a plurality of consecutive portions 31a-d according to the longitudinal direction X, each deck portion being fixed at its front end to a first frame and at its rear end to a second frame directly consecutive to the first frame.

At least two consecutive portions overlap/cover one another partially, in the manner of tiles, perpendicularly to a frame 32-3, 32-4. In the examples illustrated in FIGS. 2, 4 and 6, the deck 31 comprises four deck portions 31a to 31d (from front to rear) with two deck portions 31b, 31c each partially covering the deck portion, 31c, 31d, respectively, which is consecutive to them.

Each deck portion 31a-d is provided with an inner face 71 and an outer face 70 opposite the inner face 71, the outer face 70 being intended to be shrouded in the primary flow 36. In order to withstand the thermal stresses, a deck portion 31a-d is preferably realized in Inconel® or in a titanium alloy.

Each frame 32 occurs in the form of a structural panel extending in the transverse plane YZ to the box and having a front face, a rear face and four edges delimiting said faces. The front and rear faces, having substantially identical surfaces, are in the form of an isosceles trapezoid in the transverse plane YZ. The two lateral edges 32b of the frame 32 are each intended to receive a side panel 44. The upper edge 32a of the frame 32-1 situated at the front end and of the frame 32-5 situated at the rear end of the fairing 30 are arranged to conform to another structure of the pylon 4 on which they are fixed, namely as in the example illustrated in FIG. 1, the rear aerodynamic structure 26 or the rigid structure 8. The lower edge 32c of a frame has, in the transverse plane YZ, a curved shape opening towards the outside with respect to the fairing 30.

An upstream deck portion 31b, 31c covering a downstream deck portion 31c, 31d at the level of a frame 32-3, 32-4 has its rear end fixed to said frame by means of a rear flange 50 which allows the deck portion 31b, 31c to be suspended from a frame 32-3, 32-4 with a non-zero space between the inner face 71 of said deck portion and the lower edge 32c of said frame.

Figure 3:
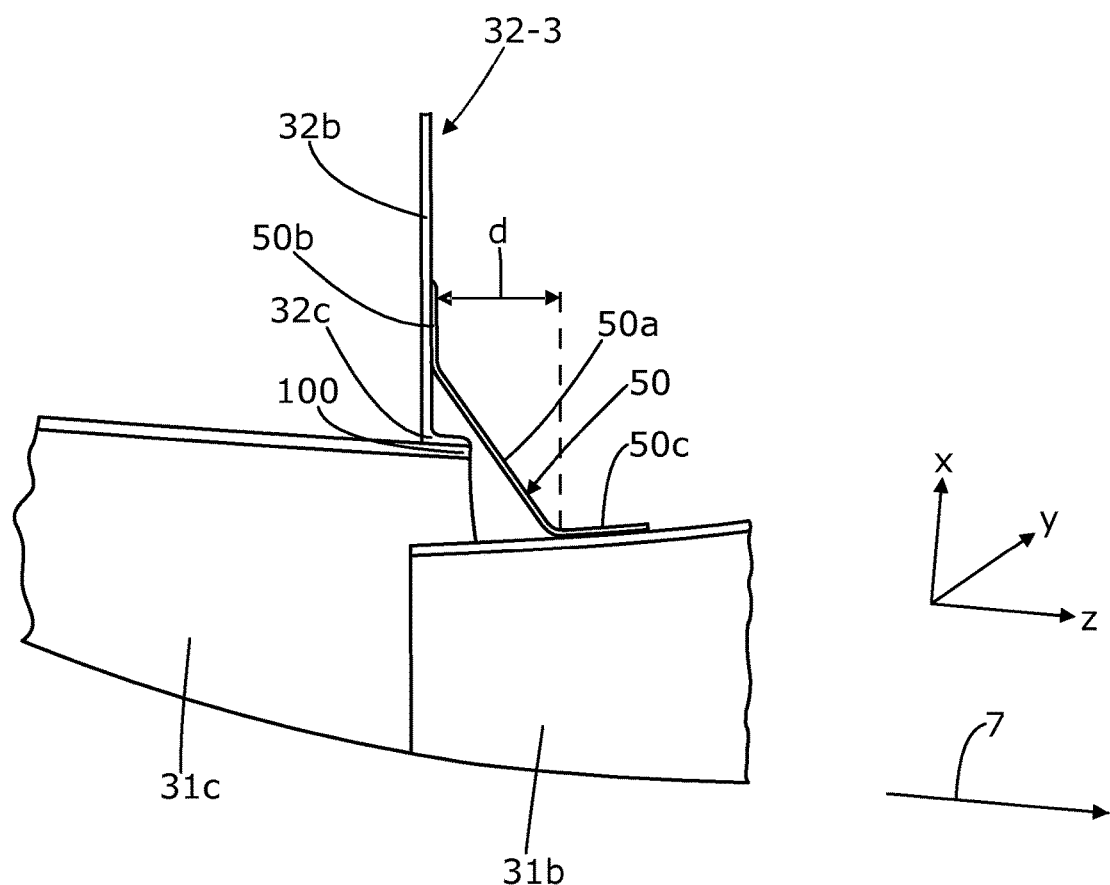
FIG. 3 is a view of the fairing according to the arrow A in FIG. 2.

In a first embodiment of the invention illustrated in relation to FIGS. 2 and 3, the second deck portion 31b and the third deck portion 31c are portions partially covering the third deck portion 31c and the fourth 31d deck portion, respectively. The second 31b portion and the third 31c portion have their rear end fixed indirectly to the third frame 32-3, the fourth 32-4 frame, respectively, and have their front end fixed directly to the second frame 32-2 and the third frame 32-3, respectively.

The second portion 31b and the third portion 31c are greater in length than the distance between the two frames 32-2, 32-3; 32-3, 32-4 to which they are fixed in such a manner as to cover the portions consecutive to them partially. A covering deck portion 31b, 31c preferably has a length greater by 2% to 7% than that of the distance between the frames 32-3, 32-3; 32-3, 32-4 to which it is fixed.

The other portions that are not covering have their rear and front sections fixed directly to the frames, in other words, in contact with their lower edges. Hence, as illustrated in FIG. 2, the first deck portion 31a has its front end fixed directly with the lower edge 32c of the first frame 32-1 and its rear end directly fixed with the lower edge 32c of the second frame 32-2, whereas the fourth deck portion 31d has its front end directly fixed to the lower edge 32c of the fourth frame 32-4 and its rear end directly fixed to the lower edge 32c of the fifth frame 32-5.

According to a longitudinal section of the fairing 30 illustrated in FIG. 3, a rear flange 50 allowing the rear end of a deck portion 31b, 31c to be fixed to a frame 32-3, 32-4 is a planar support 50a exhibiting a first extension 50b and a second extension 50c curved relative to the planar support 50a. The first extension 50b is fixed by screwing to the front face of a frame 32-3, 32-4, whereas the second extension 50c is fixed by screwing to the inner face 71 of a deck portion 31b, 31c to which it conforms at the level of the rear end of said portion 31b, 31c. The planar support 50a is inclined relative to the horizontal plane XY such that the second extension 50c is situated according to the longitudinal axis X at a non-zero distance d from the front face of the frame 32-3, 32-4 on which the first extension 50b is fixed.

The length of the planar support 50a and its angle of inclination with respect to the horizontal plane XY are chosen such that a front edge 100 of the covered downstream portion 31c, 31d is housed between the lower edge 32c of the frame 32-3, 32-4 and the upstream covering deck portion 31b, 31c.

The planar support 50a is preferably inclined in respect of the horizontal plane XY at an angle of between 15° and 70°. It will be noted that the upstream covering deck portion 31b, 31c may be in contact with or at a distance from the downstream portion 31c, 31d that it covers.

The invention is advantageous in that the partial covering of a deck portion 31c, 31d by a deck portion 31b, 31c makes it possible to prevent the primary flow 36 with a very high temperature from rising and spreading between these two deck portions at their interface. The heat protection deck 31 according to the invention is made leak-proof through its design. Thin sealing strips may not be required to leak-proof the deck.

In a second embodiment of the invention described with reference to FIGS. 4 and 5, a downstream deck portion 31c, 31d partially covered by an upstream deck portion 31b, 31c perpendicular to a frame 32-3, 32-4 has its front end indirectly fixed to said frame via a front flange 51. The front flange 51 allows the deck portion 31c, 31d to be suspended from said frame with a non-zero space between the inner face 71 of said deck portion and the lower edge 32c of said frame.

Figure 5:
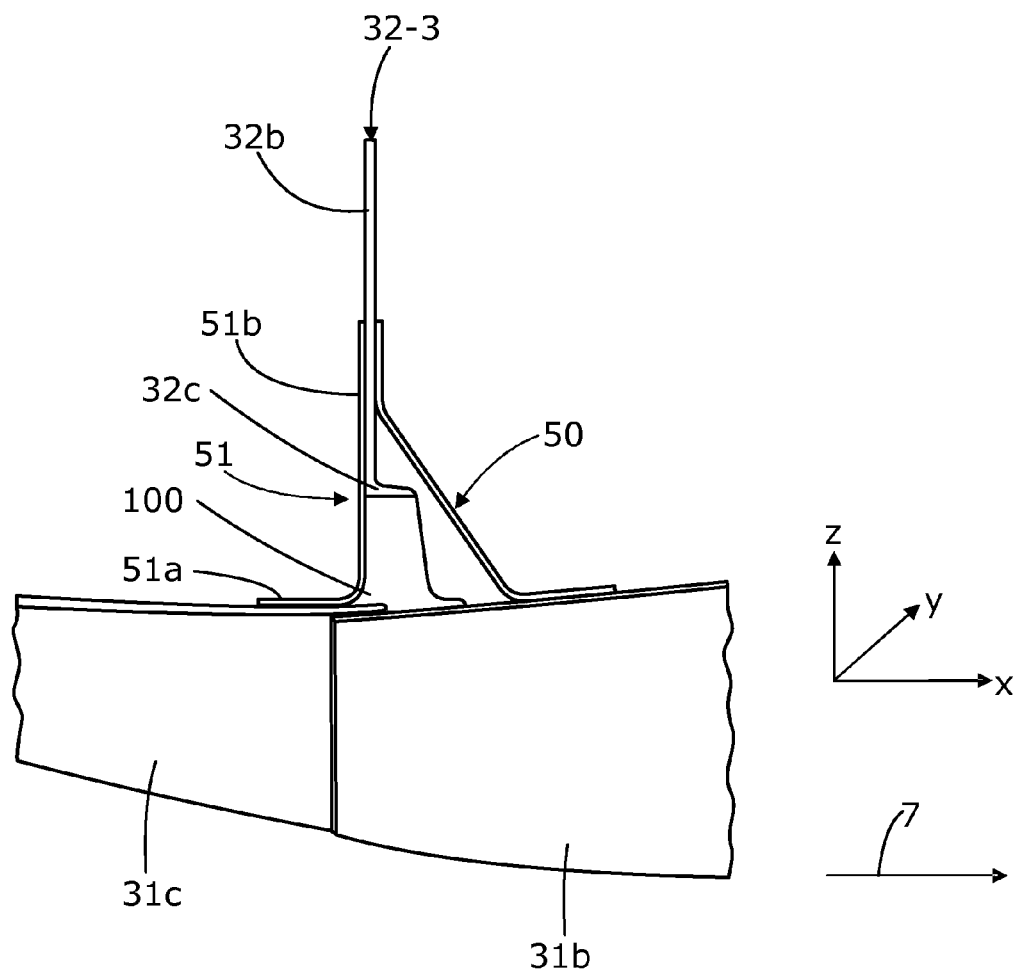
FIG. 5 is a view of the fairing according to the arrow B in FIG. 4.

According to a longitudinal section of the fairing 30 illustrated in FIG. 5, a front flange 51 has an L-shape, the base 51a whereof is fixed by screwing to the front section of a deck portion 31c, 31d and the long section of the L 51b is fixed by screwing to the rear face of a frame 32-3, 32-4. The base of the L 51a conforms to the deck portion 31c, 31d on which it is fixed, whereas the long section of the L 51b itself is substantially planar.

The front flange 51 and the rear flange 50 fixed to a frame 32-3, 32-4 are preferably fixed to the latter by a plurality of screw-nut systems, each screw passing through a bore made in the front flange 51, a bore made in the frame and a bore made in the rear flange 50.

In addition to the advantages of the invention set out above, this second embodiment allows the transfer of thermo-mechanical stresses from deck portions 31c, d indirectly fixed to the frames 32-3, 32-4 towards said frames to be prevented. Hence, the framework of the box only undergoes very slight deformation by thermal expansion and the overall deformation level of the fairing 30 is therefore kept relatively low, which produces a satisfactory aerodynamic quality, contributing to the reduction in the effects of parasite drag and an improvement in the aircraft's performance/consumption ratio.

Figure 7:
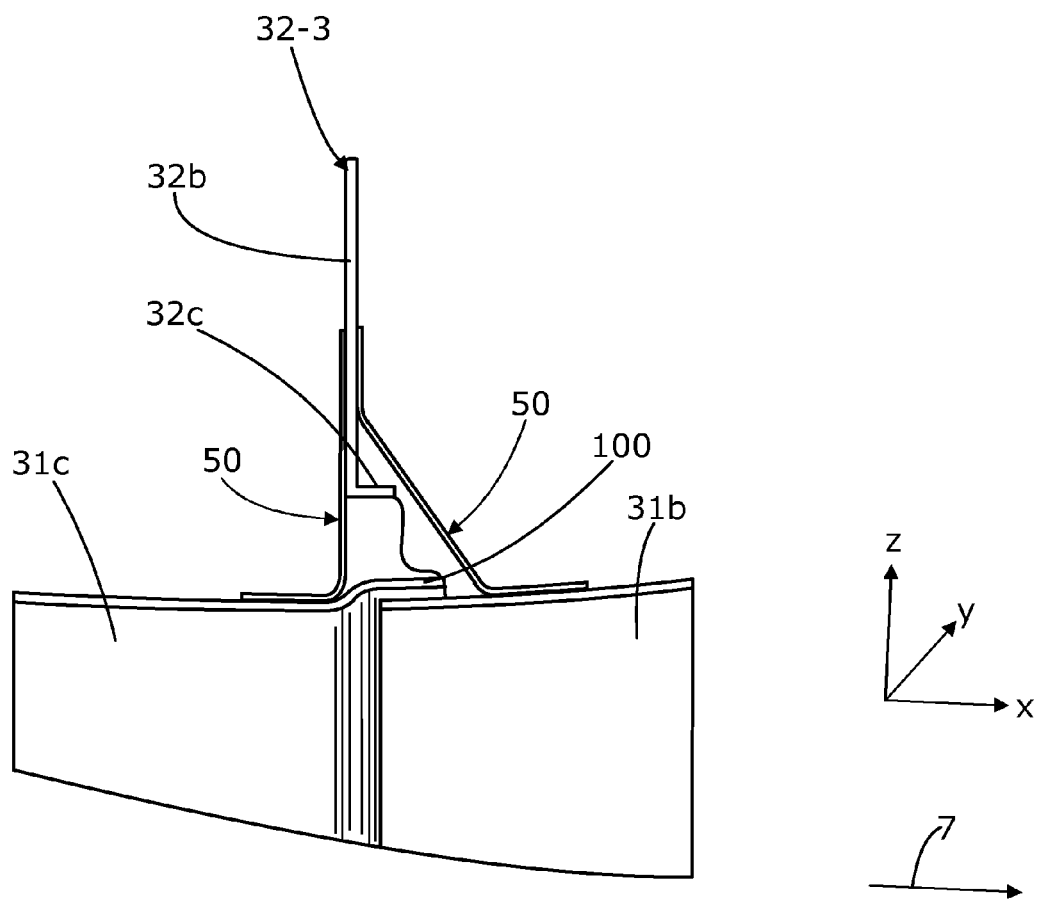
FIG. 7 is a fairing view according to the arrow C in FIG. 6.

With reference to FIGS. 6 and 7 and in a third embodiment of the invention, an upstream deck portion 31b, 31c covering a downstream deck portion 31c, 31d has a length substantially equal to the distance between the two frames 32-2, 32-3; 32-3, 32-4 to which it is fixed, whereas a covered downstream deck portion 31c, 31d is greater in length than the distance between the two frames 32-3, 32-4; 32-4, 32-5 to which it is fixed. The covered downstream portion 31c, 31d preferably has a length greater by 2% to 7% than the distance between the two frames 32-3, 32-4; 32-4, 32-5 to which it is fixed.

Moreover, the covered downstream deck portion 31c, 31d has at its front end a curved edge 100 twice 90° according to axes perpendicular to the longitudinal axis X and having opposite angles so as to form a housing for the free end of the adjacent covering upstream deck 31c, 31d. In a sectional view according to the vertical plane XZ illustrated in FIG. 7, the downstream deck portion 31c, 31d, except for its curved edge 100, has an outer face 70 situated in the extension of the outer face 70 of the covering upstream deck portion 31b, 31c. The curved edge 100 forms a section substantially parallel to the remainder of the covered downstream deck portion 31c, 31d, but which is offset in height in respect thereof and is housed between the lower edge 32c of the frame 32-3, 32-4 and the covering upstream deck portion 31b, 31c in the space provided between the front and rear flanges 50, 51.

The presence of the curved edge 100 optimizes the aerodynamic nature of the box, since the successive deck portions are situated in the extension of one another, thereby forming a smooth deck surface 31. This means that the flow of the primary flow sweeping over the deck 31 is laminar. The presence of curved edges ensures tightness between two deck portions 31b, 31c; 31c, 31d which are covered and thereby make it possible to prevent the primary flow 36 with a very high temperature to rise and spread between said two deck portions.

In order to withstand the thermal stresses, the front and rear flanges 50, 51 are preferably realized in Inconel® or an equivalent titanium alloy.

An aerodynamic fairing (30) of a turbojet pylon has been conceived and is disclosed herein. The fairing has the shape of a box extending along a longitudinal axis (X) and comprising at least two consecutive deck portions, an upstream portion (31b) and a downstream portion (31c), respectively, along said longitudinal axis (X) and each having a front end and a rear end, the fairing (30) comprising at least one frame (32-3) oriented transversely to the longitudinal axis (X) and having a lower edge (32c), said upstream portion (31b) having its rear end fixed to said frame and the downstream portion (31c) having its front end fixed to said frame, said upstream portion being fixed to the frame (32-3) by means of a rear flange (50) with a non-zero space situated between the lower edge of the frame and the upstream portion, said front end of the downstream portion (31c) being situated between the lower edge of the frame (32c) and the upstream portion.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. An aerodynamic fairing for a pylon of a turbojet engine, the fairing comprising:
    a plurality of consecutive deck portions oriented along a longitudinal axis of the pylon, the consecutive deck portions including an upstream deck portion and a downstream deck portion partly overlapped by the upstream deck portion;
    a plurality of consecutive frames oriented transversely to the longitudinal axis, each frame having a corresponding lower edge, and
    the upstream deck portion being directly fixed at its front end to a corresponding lower edge of a first frame of the plurality of consecutive frames and at its rear end indirectly to a second frame of the plurality of consecutive frames, directly following the first frame, by a first rear flange, which allows the upstream deck portion to be suspended from the lower edge of the second frame, and
    the downstream deck portion being directly fixed at its front end to a corresponding lower edge of the second frame so that the downstream deck portion is partly overlapped by the upstream deck portion,
    wherein the rear flange is constructed so as to cause the upstream deck portion partly overlapping the downstream deck portion to either be in contact with or at a distance from the downstream deck portion.

2. The aerodynamic fairing as in claim 1, further comprising a front flange fastening the front end of the downstream deck portion to the lower edge of the frame.

3. The aerodynamic fairing as in claim 2, wherein the front end of the downstream deck portion includes a curved edge and the curved edge overlaps the rear end of the upstream deck portion.

4. The aerodynamic fairing as in claim 3, wherein a lower surface of the downstream deck portion is offset in a vertical direction from an upper surface of the upstream deck portion.

5. The aerodynamic fairing as in claim 2, further comprising a third frame, wherein each of the consecutive frames is transverse to the longitudinal axis and forms a cross sectional structural support for the pylon;
    a second rear flange extends from a rear portion of the downstream deck portion and connects to the second frame, and an upstream edge of a second downstream deck portion is directly fastened to a corresponding lower edge of the second frame, and
    a third rear flange extends from a rear portion of the second downstream deck portion to the third frame, wherein a distance between the second and third frames is less than a length of the second downstream deck portion.

6. The aerodynamic fairing as in claim 1, further comprising a third frame, wherein each of the consecutive frames is transverse to the longitudinal axis and forms a cross sectional structural support for the pylon;

wherein a rear region of the downstream deck portion connects to the second frame, and an upstream edge of a second downstream deck portion is directly fastened to the second frame, and wherein a rear region of the second downstream deck portion connects to the third frame, and a distance between the third and second frames is less than a length of the second downstream deck portion.

7. An aerodynamic fairing for a pylon of a turbojet engine, the fairing comprising:

a front face configured to be adjacent the pylon extending between the turbojet engine and a wing;

side panels each extending downstream of the front face and extending down from the wing;

a plurality of consecutive frames between and supporting the side panels, wherein each of the frames is oriented in a plane transverse to a longitudinal axis of the pylon, and wherein each of the frames includes a corresponding lower edge;

a deck formed from a plurality of consecutive portions, an upstream portion of the plurality of consecutive deck portions being directly attached at its front end to a corresponding lower edge of a first frame of the plurality of consecutive frames to the lower edge of the frame, the plurality of deck portions each including an outer surface facing downward and configured to be exposed to a high-temperature primary flow from the turbojet engine;

a downstream portion of the plurality of consecutive deck portions including a front edge region overlapping a rear edge region of the upstream portion of the deck, an upper surface of the front edge region being directly joined to the corresponding lower edge of a second frame of the plurality of consecutive frames, directly following the first frame, such that the front edge portion is sandwiched between the corresponding lower edge of the second frame and the rear edge region of the upstream portion of the deck, and a flange extending between and attaching the upstream portion at its rear edge region indirectly to the second frame and whereby a gap is formed between the corresponding lower edge of the second frame and the read edge region of the upstream portion of the deck.

8. The aerodynamic fairing of claim 7 further wherein side panels are each attached to a respective side edge of the frame, wherein a distance between upstream ends of the side panels is greater than a distance between downstream edges of the side panels.

9. The aerodynamic fairing of claim 7 wherein the deck is curved in cross section.

10. The aerodynamic fairing of claim 7 further comprising a front flange fastening the front end of the downstream portion to the lower edge of the frame.

11. The aerodynamic fairing as in claim 10, wherein the front end of the downstream portion includes a curved edge overlapping a rear end of the upstream portion.

12. The aerodynamic fairing as in claim 7, wherein a lower surface of the downstream portion is offset in a vertical direction from an upper surface of the upstream portion.

13. The aerodynamic fairing as in claim 10, further comprising a third frame, wherein each of the consecutive frames is transverse to the longitudinal axis and forms a cross sectional structural support for the pylon;

a second rear flange extends from a rear portion of the downstream portion and connects to the second frame, and an upstream edge of a second downstream portion is fastened to a corresponding lower edge of the second frame, and the third rear flange extends from a rear portion of the second downstream portion to the third frame, wherein a distance between the second and third frames is less than a length of the second downstream portion.

14. The aerodynamic fairing as in claim 7, further comprising a third frame, wherein each of the consecutive frames is transverse to the longitudinal axis and forms a cross sectional structural support for the pylon;

wherein a rear region of the downstream portion connects to the second frame, and an upstream edge of a second downstream portion is directly fastened to the second frame, and wherein a rear region of the second downstream portion connects to the third frame, and a distance between the third and second frames is less than a length of the second downstream portion.

15. The aerodynamic fairing as in claim 5, wherein each of the remaining plurality of consecutive deck portions, other than the upstream portion, the downstream portion and the second downstream portion, being directly attached to corresponding supporting frames of the plurality of consecutive frames.

16. The aerodynamic fairing as in claim 6, wherein each of the remaining plurality of consecutive deck portions, other than the upstream portion, the downstream portion and the second downstream portion, being directly attached to corresponding supporting frames of the plurality of consecutive frames.

17. The aerodynamic fairing as in claim 13, wherein each of the remaining plurality of consecutive deck portions, other than the upstream portion, the downstream portion and the second downstream portion, being directly fastened to corresponding supporting frames of the plurality of consecutive frames.

18. The aerodynamic fairing as in claim 14, wherein each of the remaining plurality of consecutive deck portions, other than the upstream portion, the downstream portion and the second downstream portion, being directly fastened to corresponding supporting frames of the plurality of consecutive frames.

* * * * *